No. 698,494. Patented Apr. 29, 1902.
A. HERSCHMANN.
BRAKING DEVICE FOR COMPENSATING GEAR.
(Application filed Nov. 19, 1901.)
(No Model.)
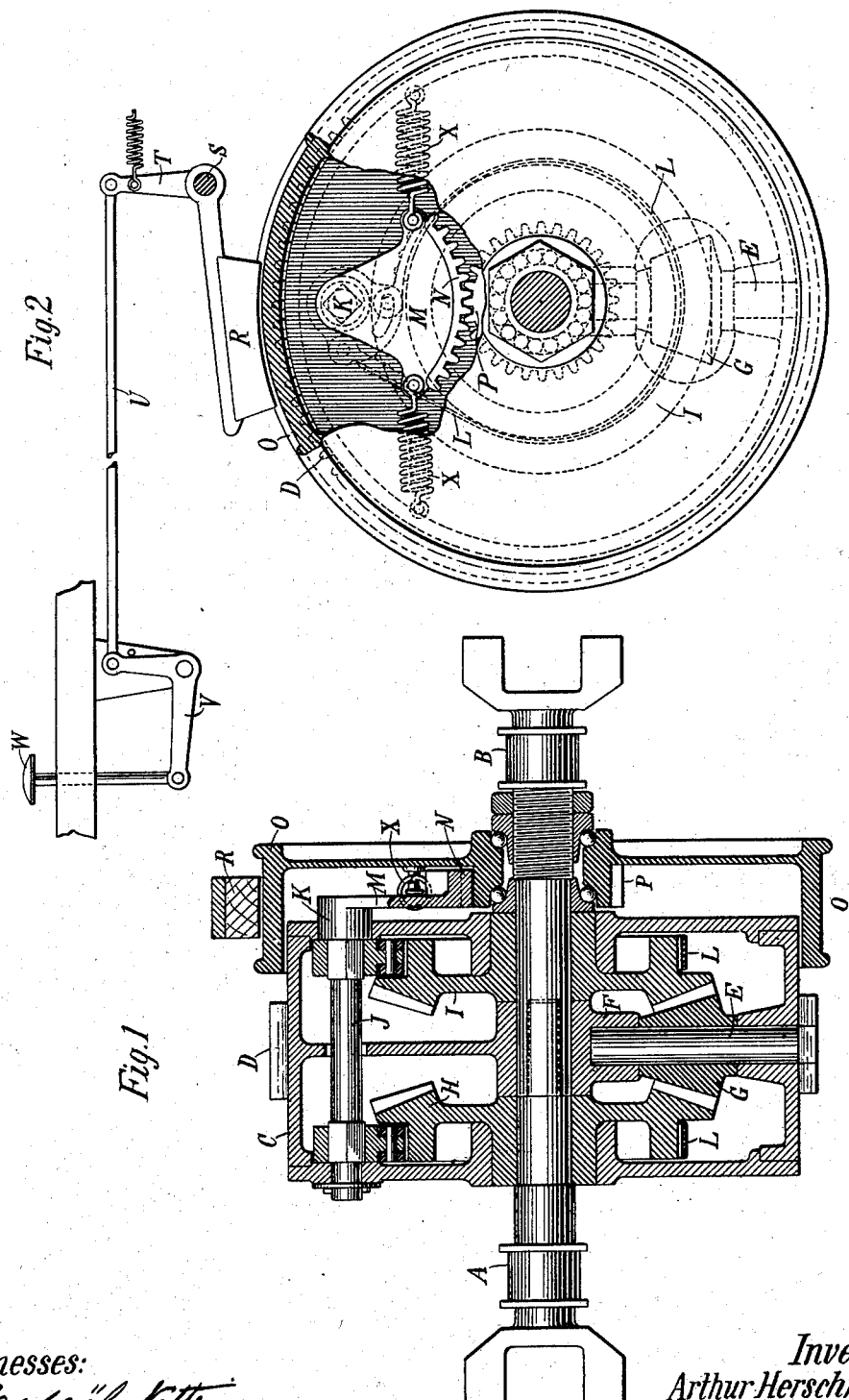
Witnesses:
Inventor
Arthur Herschmann

UNITED STATES PATENT OFFICE.

ARTHUR HERSCHMANN, OF NEW YORK, N. Y.

BRAKING DEVICE FOR COMPENSATING GEARS.

SPECIFICATION forming part of Letters Patent No. 698,494, dated April 29, 1902.

Application filed November 19, 1901. Serial No. 82,887. (No model.)

*To all whom it may concern:*

Be it known that I, ARTHUR HERSCHMANN, a subject of the Emperor of Austria-Hungary, residing in the borough of Manhattan, in New York city, county and State of New York, have made certain new and useful Improvements in Braking Devices for Compensating Gears, of which the following is a full, clear, and exact description, reference being had to the drawings which accompany and form a part of the same.

The object of the invention is to provide means whereby a braking effect may be imparted directly to the compensating or differential gear, more particularly, of self-propelled vehicles, although in its wider applications it is useful in any situation where there is need of a brake directly applicable to differential gears.

In self-propelled vehicles, particularly those of higher power or great carrying capacity—for example, trucks or vans—it sometimes happens that when rounding a corner or curve (when the differential gear is in action) an obstruction or depression under one driving-wheel throws the load of the vehicle so far toward the low wheel that it is stalled. This, even if but momentary, causes the whole driving power of the motor to be applied to the other driving-wheel, thus tending to deflect the vehicle sharply toward the obstructed side. Under such conditions safety requires convenient and efficient means for throwing the differential gear out of action. I have found that the best means of accomplishing this is by a reliable and efficient brake applied directly to one of the elements of the differential gear itself; but although previous attempts have been made to apply such braking action to the compensating gear they have been found to be ineffective in some cases. In others they were unsatisfactory because the means employed locked the rotating parts so suddenly as to affect them injuriously. The present invention is designed to afford a compensating-gear brake no less effective than the old forms, but graduated in application—that is to say, a brake the extent and completeness of whose effect is subject to the control of the operator.

Another object of my invention is to provide means which shall be automatic under certain conditions. For example, sometimes power is shut off just at the time when the compensating gear is in full action and when the momentum of the vehicle is great. In such a case, in the use of my device, the brake is applied automatically.

In the drawings, Figure 1 is a sectional view of an ordinary form of compensating gear having my invention applied thereto. Fig. 2 is a side elevation, partly in cross-section, of the same, including, besides, the representation of the lever system for operating the same.

A B represent the two parts of the driving-shaft, provided with a compensating or differential gear consisting of a drum C, loosely mounted on the two abutting shaft ends A B and of the other parts which I shall describe. On the periphery of this drum are teeth D, with which the motor-pinion meshes. Inside the drum are one or more radial pins or spindles E, extending inward from the drum to a hub F, which incloses the abutting shaft ends A B. On each of these radial spindles E is loosely mounted a bevel gear or pinion G, all of which pinions mesh with the vertical gears H I, which are securely mounted on the respective shaft ends A B. This is an ordinary form of compensating gear, sometimes called a "planetary" system, in the use of which the two shafts A B will rotate at the same speed when power is applied to both alike; but when the power applied varies, as when the direction of motion of the vehicle is changing, the rotation of the pinions G on their spindles E secures a difference in the speed of rotation of the two gears H and I, consequently of the respective shaft ends A and B.

The brake which is the subject of my invention consists of the following-related devices: A rotatable spindle J is mounted in the drum C, one end of said shaft extending outside of the drum, as at K. To this shaft is attached a band brake or brakes L, so arranged as to act upon one or (preferably) both of the vertical gears H I. The bands L are so mounted and arranged that when the shaft J is rocked to one side or the other of its normal position the band is tightened and the brake applied. While I prefer to have two of these bands, it may in some cases be sufficient to have but a single one, such construction being within my invention. On the projecting end K of the shaft J is mounted an arm M, preferably sector-shaped, the lower or curved end of which is gear-cut, as shown at Fig. 2, so as to form a curved rack N. Mounted loosely on one of the shaft ends, as B, and adjacent to the side of the drum C is a disk or pulley shaped wheel or idler O. This disk is preferably mounted on ball-bearings, so as to rotate freely and without much friction, and is sufficiently heavy in construction to have very appreciable inertia. The hub of this wheel O on the side next to the drum C is provided with teeth P, which engage with the segmental rack M. The periphery of the wheel O is so shaped that a brake-shoe R may be applied to it. The brake-shoe R has a series of levers T U V, terminating in a stud or foot-lever W, the relation being such that when lever W is depressed the brake-shoe R is applied to the periphery of the wheel O.

In the normal operation of the vehicle, whether the differential gear is in or out of active service, the wheel O rotates freely and approximately at the speed of the shaft end B. If, however, during the active service of the differential gear, a relatively great difference of speed between the wheel O and the shaft end B, as by the application of the brake R, or by the sudden stopping of the motive power from the gear-drum C, there will be substantial displacement or motion of wheel O with reference to the drum B. The pinion P of wheel O will then swing the rack M to one side or the other, thus causing a backward or forward rocking of the shaft J, thereby applying the brake-bands L to the gears H I. It will be understood that this brake application will be gradual, not instantaneous, for the rotation of the drum C in case of an application of the brake R and of the wheel O in case of a shutting off of the driving power from drum C will cause the segment M and shaft J to move from the idle position shown in Fig. 2 to the extreme right or left hand position, thus tightening up the brake-bands L until they stop the relative movement between the vertical gears H I. Springs X X may be applied to segment M, arranged to restore it to the normal position shown in Fig. 2.

Obviously wide variations may be made in the form, arrangement, and connections of the various parts without altering the substance of my invention, and therefore I do not limit myself to the construction shown and described.

What I claim as my invention is—

1. In a self-propelled vehicle, the combination of a divided shaft a compensating-gear drum applied thereto, an idler or supplemental wheel loosely mounted on one part of said divided shaft and normally rotating at substantially the same speed as said drum, and means operated by the development of substantial difference in speed of rotation between said idler and said drum for causing the stoppage of the compensating-gear device carried by said drum, substantially as and for the purposes described.

2. The combination of a divided shaft, a compensating gear applied thereto, an idler carried by one part of said divided shaft, a braking device capable of application to one or more of the elements of said gear, and means for applying said braking device, said means being actuated by the development of substantial difference in the speed of rotation between said compensating gear and said idler, substantially as and for the purposes described.

3. In a compensating or differential gear, the combination of a series of gears in planetary relation to each other, a driving-drum in operative relation thereto, a divided shaft upon which said gears are mounted, an idler loosely mounted upon one part of said divided shaft, a rocking spindle carried by said driving-drum, braking devices applied to one or more of the elements of said compensating gear, a rack mounted on said rocking shaft, a pinion carried by the axis of said hub and arranged to intermesh with said rack, and means for developing at will a difference in speed of rotation between said idler and said drum, substantially as and for the purposes described.

4. A braking device for compensating gears of self-propelled vehicles comprising a divided shaft an idler loosely mounted upon one part of said shaft, a pinion carried at the axis of rotation of said idler, a compensating-gear drum, a rocking spindle carried thereby, a segmental rack meshing with said pinion and carried by said spindle, and a brake in operative relation to one or more of the elements of the compensating gear and arranged to be applied by the movement of said rocking shaft, substantially as and for the purposes described.

ARTHUR HERSCHMANN.

Witnesses:
M. LAWSON DYER,
DRURY W. COOPER.